MOTOR VEHICLE

Filed Aug. 17, 1965 3 Sheets-Sheet 1

INVENTOR.
EUGENE R. FOX
BY
Merchant, Merchant & Gould
ATTORNEYS

MOTOR VEHICLE
Filed Aug. 17, 1965 3 Sheets-Sheet 2
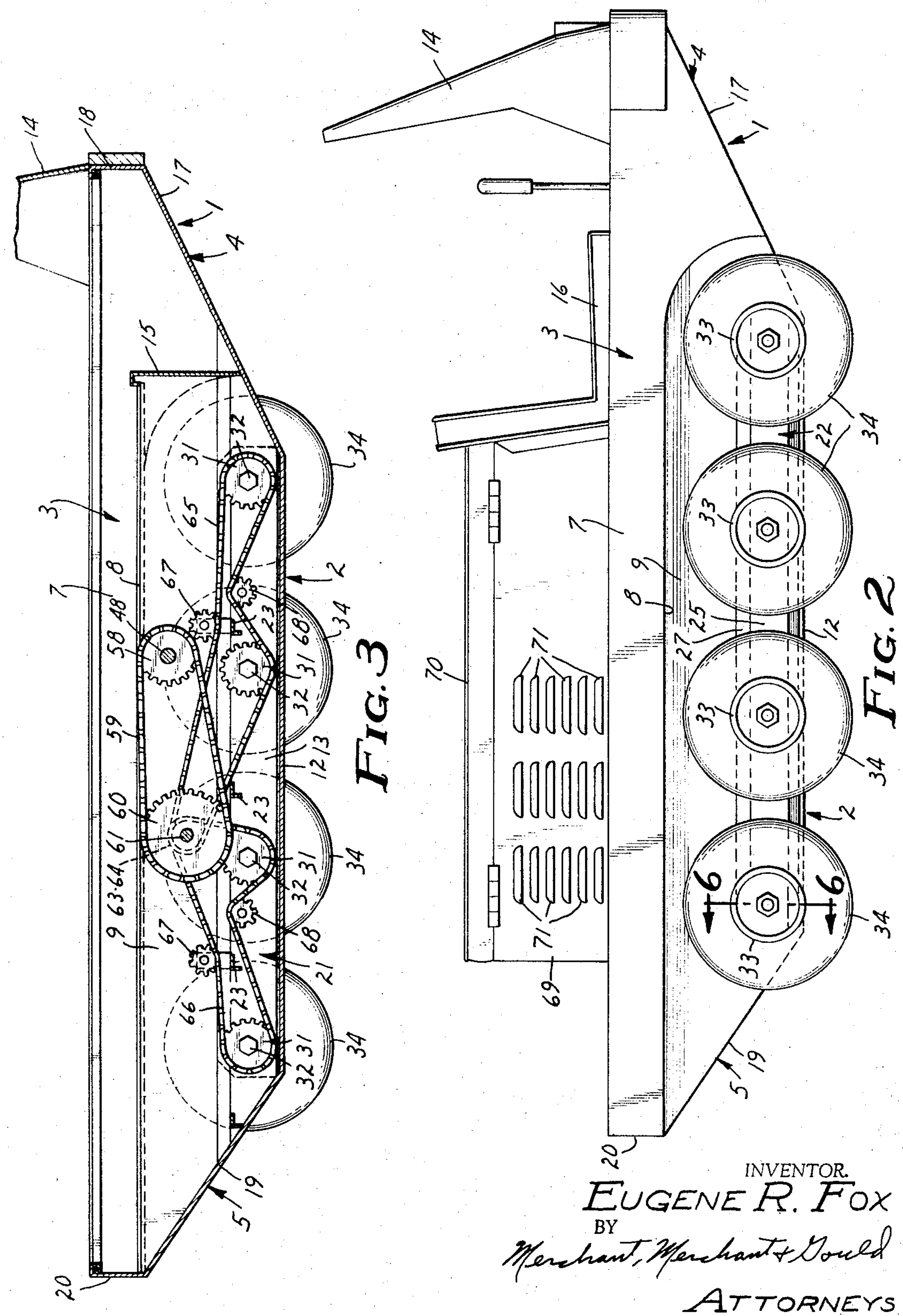
INVENTOR.
EUGENE R. FOX
BY
Merchant, Merchant & Gould
ATTORNEYS Feb. 6, 1968 E. R. FOX 3,367,436

MOTOR VEHICLE

Filed Aug. 17, 1965 3 Sheets-Sheet 3

INVENTOR.
EUGENE R. FOX
BY
Merchant, Merchant & Gould
ATTORNEYS 3,367,436

MOTOR VEHICLE

Eugene R. Fox, Minneapolis, Minn., assignor to Cat-A-Gator Corporation, Hopkins, Minn., a corporation of Minnesota Filed Aug. 17, 1965, Ser. No. 480,360
3 Claims. (Cl. 180—22)

ABSTRACT OF THE DISCLOSURE

A motor vehicle having a plurality of drive wheels at opposite sides and body structure for supporting the wheels and maintaining the wheel axes in parallel relationship. Drive means within the body structure is operatively connected to each drive wheel, said drive wheels having axles extending into the interior of the body structure through rigid tubular members fixed in the body structure.

*Summary of the invention*

An important object of this invention is the provision of a vehicle adapted for use over rough and uneven terrain, and in roadless areas of difficult traverse, such as swamp, brush lands, sand dunes, snowdrifts and the like; and of body construction including means for mounting the drive wheels at each side of the vehicle for rotation on parallel axes and for maintaining the parallel relationship between said axes.

To the above ends, I provide a vehicle comprising a body having wall structure defining a compartment, an engine in the vehicle, the wall structure including a pair of laterally spaced rigid tubular portions extending longitudinally of the body, a plurality of rigid bearing tubes extending transversely through each of the tubular body portions and disposed on fixed parallel generally horizontal axes, a plurality of drive shafts, each journalled in a different one of the bearing tubes and each having an inner end projecting into said compartment and an outer end portion extending outwardly of the wall structure, a plurality of drive wheels each mounted on the outer end portion of a different one of the drive shafts for common rotation therewith, and power transmission in the compartment operatively connecting the engine with each of the drive shafts. The transmission mechanism includes clutch means whereby the drive wheels at each side of the wheel may be driven from the engine independently of the drive wheels at the opposite side of the vehicle.

*Brief description of the drawings*

Referring to the drawings, which illustrate the invention, and in which like reference characters indicate like parts throughout the several views:

FIG. 2 is a view in side elevation of the vehicle of FIG. 1;

FIG. 3 is a fragmentary longitudinal section taken substantially on the line 3—3 of FIG. 1;

*Description of the preferred embodiment*

Figure 1:
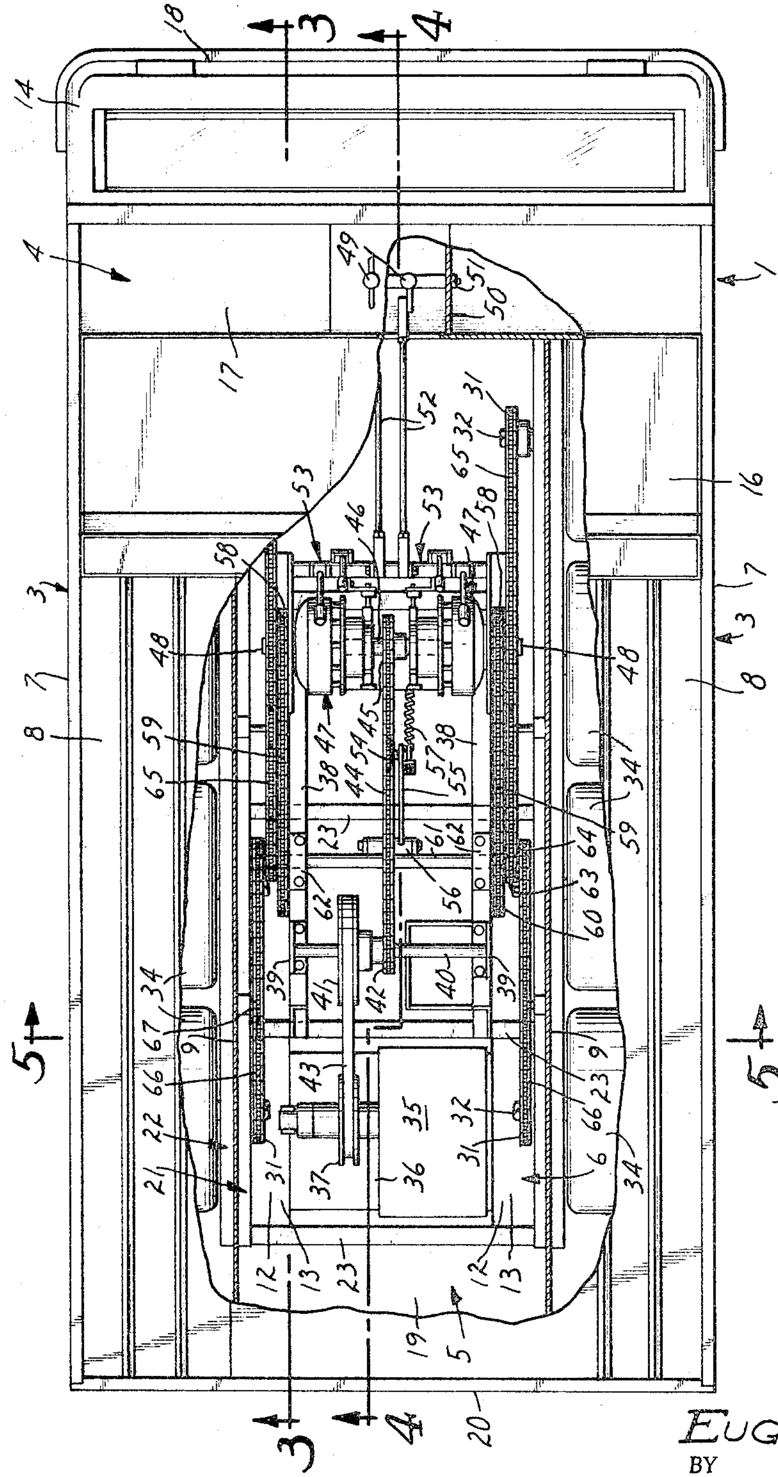
FIG. 1 is a view in top plan of a vehicle produced in accordance with this invention.

In the preferred embodiment of the invention illustrated, a vehicle body 1 is shown as comprising an elongated generally horizontally disposed bottom wall 2, laterally spaced side walls 3, and front and rear walls 4 and 5 respectively, defining a compartment 6. The body 1 is preferably made from heavy sheet metal, such as steel, the several walls being welded together to provide a rigid body structure. The side walls 3 are formed to provide upper side wall elements 7, generally horizontally disposed deck elements 8 and vertically disposed lower side wall elements 9. The bottom wall 2 is formed to provide a central generally horizontally disposed portion 10, depending portions 11 at opposite sides of the central portion 10, and generally horizontally disposed side edge portions 12 projecting laterally outwardly from the lower edges of the depending portions 11, and welded or otherwise rigidly secured to the lower edges of the lower side wall elements 9. The lower side wall elements 9 cooperate with the bottom wall portions 11 and 12 to define longitudinally extending upwardly opening troughs 13. The body 1 further includes a windshield 14 that extends transversely across the front end of the vehicle, and a cross brace member 15 upon which is mounted a driver and passenger seat 16 rearwardly of the windshield 14. The front wall 4 comprises a lower section 17 which slopes angularly upwardly and forwardly from the bottom wall 2, and a vertically disposed upper portion 18 underlying the windshield 14, the sloping portion 17 providing a footrest for the occupants of the seat 16. The rear wall 5 is likewise formed to provide an angularly rearwardly and upwardly sloping lower portion 19 and a vertically disposed upper portion 20, see FIGS. 3 and 4.

Figure 5:
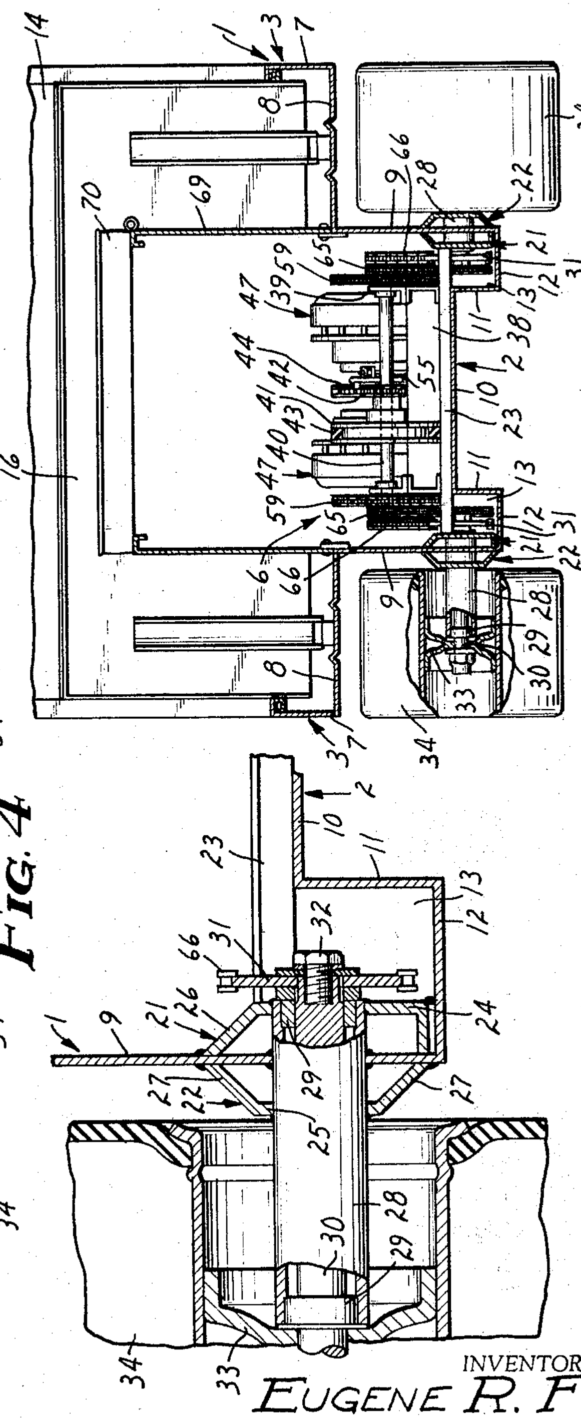
FIG. 5 is a transverse section taken substantially on the line 5—5 of FIG 1.
Figure 6:
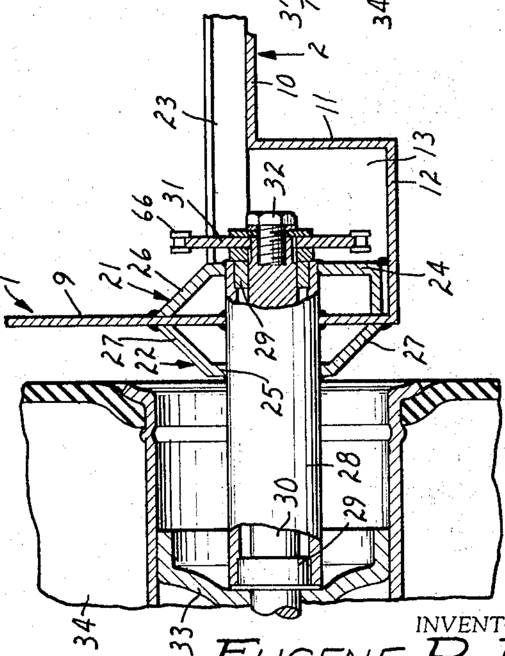
FIG. 6 is an enlarged fragmentary section taken substantially on the line 6—6 of FIG. 2.

A pair of inner and outer rigid channel members 21 and 22 extend longitudinally of and are welded to one of the vertical wall elements 9 adjacent the lower edge thereof, the inner channel member 21 being at least partially disposed in the adjacent trough 13. A second pair of opposed rigid channel members 21 and 22 are in like manner secured to the lower edge portion of the opposite side wall element 9, the cooperating pairs of channel members 21 and 22 cooperating to provide extremely rigid tubular body portions. The inner channel members 21 are connected by a plurality of brace members 23 that extend transversely across the underlying central portion 10 of the bottom wall 2, and which are welded at their opposite ends to the inner channel members 21, the brace members 23 preferably being of commercial angle iron or the like and disposed in spaced generally parallel relationship longitudinally of the body 1. With reference to FIGS. 5 and 6, it will be noted that the channel members 21 and 22 are formed to provide base walls 24 and 25 respectively and side walls 26 and 27 respectively, the base walls 24 and 25 being substantially parallel to their adjacent side wall elements 9 and the channel side walls 26 and 27 diverging from their respective base walls 24 and 25 toward the side wall element 9 of the body. This arrangement adds considerable rigidity to the channel members 21 and 22, for a purpose which will hereinafter become apparent.

A plurality of bearing tubes 28 are supported by the tubular structures comprising the opposed channel members 21 and 22, each bearing tube 28 extending through aligned apertures in the base walls 24 and 25 of their respective tubular structures or wall portions and welded or otherwise rigidly secured to the base walls 24 and 25. As shown in FIGS. 5 and 6, the bearing tubes 28 have their inner ends disposed within the compartment 6, the outer end portions of the bearing tubes 28 extending outwardly of their respective side wall elements 9. As shown, the side wall elements 9 are bored to receive the inner end portions of their respective bearing tubes 28, the tubes 28 being disposed on substantially horizontal parallel axes. Each of the bearing tubes 28 is provided with suitable bearings 29 for journalling a drive shaft 30, the inner end of which projects axially into its respective trough portion 13 of the compartment 6, a sprocket wheel or the like 31 being rigidly mounted on the inner end of each drive shaft 30 for common rotation therewith and locked in place by suitable means such as a cap screw or the like 32. Each of the drive shafts 30 extends axially outwardly of the outer end of its respective bearing tube 28 and has splined or otherwise removably but rigidly secured thereon a drive wheel 33 equipped with a pneumatic tire 34. Although it will be appreciated that any desired number of drive wheels may be used, depending upon the length of the vehicle, each side of the vehicle is shown as being provided with four drive wheels in aligned tandem relationship. As shown in FIG. 5, the wheels 33 underlie their respective deck elements 8.

Figure 4:
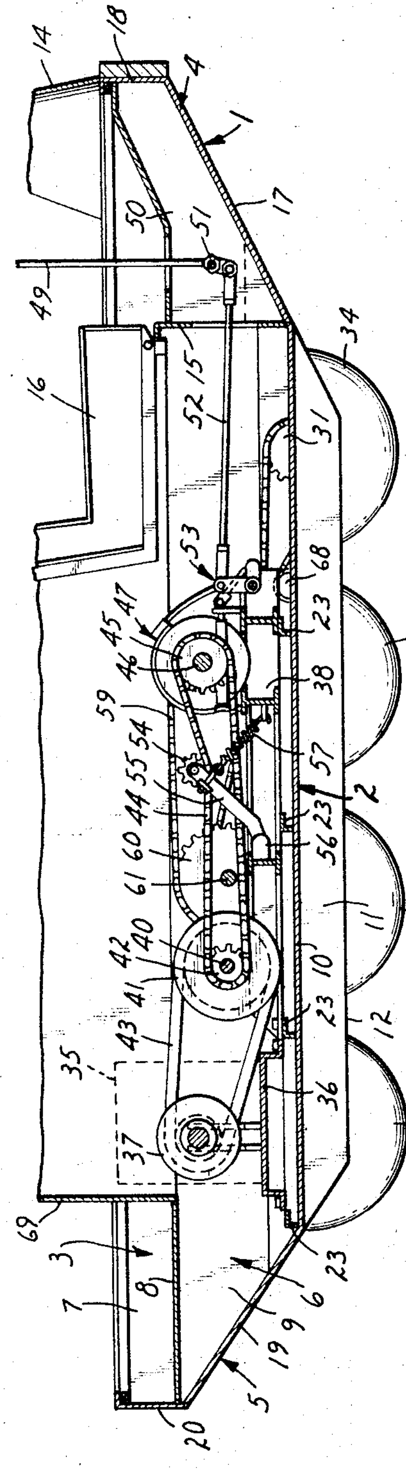
FIG. 4 is a fragmentary longitudinal section taken substantially on the line 4—4 of FIG. 1.

The several drive wheels 33 are operatively connected to an internal combustion engine 35 and power transmission mechanism now to be described. The engine 35 is mounted on a base plate 36 that is bolted or otherwise rigidly secured to an adjacent pair of the cross members 23, a drive pulley or the like 37 being mounted on the output shaft of the engine 35. A transmission mounting frame 38 is supported on brace members 23 forwardly of the engine 35, and is provided with bearings 39 which journal a jackshaft 40 on which is rigidly mounted a pulley 41 and a sprocket wheel 42. An endless drive belt or the like 43 is entrained over the pulleys 37 and 41 to drive the jackshaft 40 and sprocket wheel 42. An endless link chain 44 is entrained over the sprocket wheel 42 and a second sprocket wheel 45 rigidly mounted on a shaft 46 common to a pair of clutch mechanisms 47 mounted on the front end portion of the frame 38. The clutch mechanisms 47 are of a type in common use with transmission mechanisms, and in and of themselves do not comprise the instant invention. Hence, in the interest of brevity, further detailed showing and description of the structural details thereof is omitted. It should suffice to state that the clutch shaft 46 is adapted to be operatively engaged with either or both of a pair of output shafts 48, one for each of the clutch mechanisms 47. The clutches 47 are independently operated from the driver's seat 16 by a pair of handle-equipped control levers 49 pivotally connected to a bracket or the like 50, as indicated at 51, and a pair of control links 52 pivotally connected at their front ends to the lower ends of the control levers 49 and at their rear ends to conventional clutch-operating linkage 53 associated with respective ones of the clutch mechanisms 47. With reference to FIGS. 1 and 4, it will be seen that driving tension is maintained in the endless link chain 44 by an idler pulley or the like 54 journalled on one end of an arm 55 pivotally secured to the transmission frame 38, as indicated at 56, and a coil tension spring 57 secured at one end to the arm 55 and at its opposite end to the transmission frame 38.

The clutch mechanisms 47 are operatively coupled each to the drive wheels 33 at a different side of the vehicles, whereby the drive wheels 33 at one side of the vehicle are driven independently of those at the opposite side of the vehicle. Each output shaft 48 has mounted thereon a respective sprocket wheel 58 over which is entrained a cooperating endless link chain 59. The chains 59 run over sprocket wheels 60 that are journalled on opposite ends of a mounting shaft 61 having radially projecting ears or lugs 62 that are bolted or otherwise rigidly secured to the transmission mounting frame 38, see FIG. 1. Other sprocket wheels 63 and 64 are journalled on the outer ends of the shaft 61 and are operatively connected to their adjacent sprocket wheels 60 for common rotation therewith. Endless link chains 65 are entrained over the sprocket wheels 63 and the sprocket wheels 31 of the forward pairs of wheels 33, and other endless link chains 66 are entrained over the sprocket wheels 64 and the sprocket wheels 31 of the rearward pairs of drive wheels 33, see FIGS. 1 and 3. With reference particularly to FIG. 3, it will be seen that idler wheels 67 and 68, suitably journalled in the body structure, engage upper and lower flights of the link chains 65 and 66 to promote driving engagement between these chains and their respective sprocket wheels 31, 63 and 64.

Preferably, the compartment 6 is covered by a box-like closure or hood 69 that is provided with a hinged cover or the like 70, the hood 69 having ventilating louvers 71 for the engine or motor 35. If desired, the hood may be constructed so as to provide for chambers or compartments for tools or other equipment, these chambers being not shown.

When it is desired to move the vehicle in a straight line, with the engine running, both of the control levers 49 are manipulated to cause the driving wheels 33 on both sides of the vehicle to rotate. When it is desired to negotiate a right or left turn, one of the control levers 49 is moved to cause the drive wheels 33 at one side of the vehicle to rotate, while the other control lever 49 is moved to cause the drive wheels 33 at the opposite side of the vehicle to be operatively disconnected from the motor 35. With this arrangement, the vehicle can be turned on a very short radius. The upwardly sloping wall portions 17 and 19 permit the vehicle to ascend or descend quite abrupt slopes; and by driving all of the wheels, traction is maintained in snow, mud, or in areas of extremely dense brush and undergrowth.

The tubular body portions or structure afforded by the opposed channels 21 and 22 at opposite sides of the vehicle provides an extremely rigid mounting means for the bearing tubes 28 and maintains the axes of the bearing tubes and their shafts 30 in parallel relationship. Thus, the wheels at each side of the vehicle are maintained as to track, and alignment is maintained between cooperating pairs of the sprockets 31, mounted on the inner ends of the drive shafts 30.

This invention has been thoroughly tested and found to be completely satisfactory for the accomplishment of the objectives set forth; and while, a commercial embodiment of the vehicle of this invention has been shown and described, it will be understood that the same is capable of modification without departure from the spirit and scope of the invention, as defined in the claims.

What is claimed is:

1. A power driven vehicle comprising:

(a) a body including a generally horizontal bottom wall, laterally spaced side wall elements, and front and rear walls, (b) an engine mounted within said body, (c) pairs of opposed inner and outer channel members extending longitudinally of said side wall elements, (d) the inner and outer channel members of each pair thereof being rigidly secured to opposite sides of an adjacent side wall element to define rigid tubular structures at opposite side portions of said body, (e) a plurality of bearing tubes extending transversely through each of said tubular structures and disposed on parallel generally horizontal axes and rigidly anchored to their respective tubular structures, (f) a plurality of drive shafts one each coaxial with and journalled in a different one of said bearing tubes and each having an inner end within said compartment and an outer end portion extending outwardly of its adjacent side wall element, (g) a plurality of wheels one each rigidly mounted on the outer end portion of a different one of said shafts for common rotation therewith, (h) and power transmission mechanism in said compartment operatively connecting said engine with the inner end of each of said drive shafts.

2. The vehicle defined in claim 1 in which said tubular structures are disposed adjacent said bottom wall, and in further combination with a plurality of rigid brace members extending transversely of said compartment and having opposite ends rigidly secured to said tubular structures in overlying relation to said bottom wall, said brace members being disposed in spaced generally parallel relation longitudinally of said tubular structures.

3. The vehicle defined in claim 1 in which said front wall slopes angularly upwardly and forwardly from said bottom wall, said rear wall sloping angularly upwardly and rearwardly from said bottom wall.

References Cited

UNITED STATES PATENTS

| | | | |
|---|---|---|---|
| 1,331,087 | 2/1920 | Baster | 180—6.7 |
| 2,095,344 | 10/1937 | Nelson | 280—106 |
| 2,944,830 | 7/1960 | Osborne | 280—106 |
| 3,168,927 | 2/1965 | Garner | 180—6.48 |
| 3,204,713 | 9/1965 | Shanahan et al. | 180—6.48 |
| 3,263,763 | 8/1966 | Adams | 180—6.7 |

FOREIGN PATENTS

| | | |
|---|---|---|
| 1,189,642 | 3/1959 | France. |

BENJAMIN HERSH, *Primary Examiner.*

J. A. PEKAR, *Assistant Examiner.*